United States Patent [19]

Calloue et al.

[11] 4,029,732
[45] June 14, 1977

[54] PREPARATION OF BROMINE

[75] Inventors: Georges Calloue, Port De Bouc;
Arsène Isard, Grenoble, both of France

[73] Assignee: Produits Chimiques Ugine Kuhlmann, Paris, France

[22] Filed: July 29, 1975

[21] Appl. No.: 599,960

[30] Foreign Application Priority Data

Aug. 2, 1974 France .................. 74.26851

[52] U.S. Cl. .................. 423/500; 423/502; 423/507

[51] Int. Cl.² .................. C01B 7/10

[58] Field of Search .................. 423/500, 502, 507

[56] References Cited

UNITED STATES PATENTS

| 2,395,314 | 2/1946 | Blumer | 423/502 |
| 2,536,457 | 1/1951 | Mugdan | 423/502 |
| 3,044,862 | 7/1962 | Paul | 423/500 X |
| 3,181,934 | 5/1965 | Davis | 423/502 |
| 3,314,762 | 4/1967 | Hahn | 423/500 |
| 3,451,776 | 6/1969 | Van Dijk | 423/502 |
| 3,716,628 | 2/1973 | Klebe et al. | 423/507 |
| 3,806,590 | 4/1974 | Klebe et al. | 423/507 |

FOREIGN PATENTS OR APPLICATIONS

| 2,045,644 | 5/1972 | Germany | 423/500 |
| 523,607 | 7/1940 | United Kingdom | 423/500 |

OTHER PUBLICATIONS

J. W. Mellor's "A Comp. Treatise on Inorganic and Theo. Chem.", vol. 2, 1922, p. 66, Longmans, Green & Co.

Primary Examiner—Edward Stern
Attorney, Agent, or Firm—Pennie & Edmonds

[57] ABSTRACT

Bromine is prepared by a method which comprises contacting hydrogen peroxide with an aqueous solution containing bromide ion and rapidly removing the bromine as it is formed. This method is particularly suitable for obtaining bromine from seawater, using the conventional intermediate, bromosulfuric solution.

8 Claims, 1 Drawing Figure

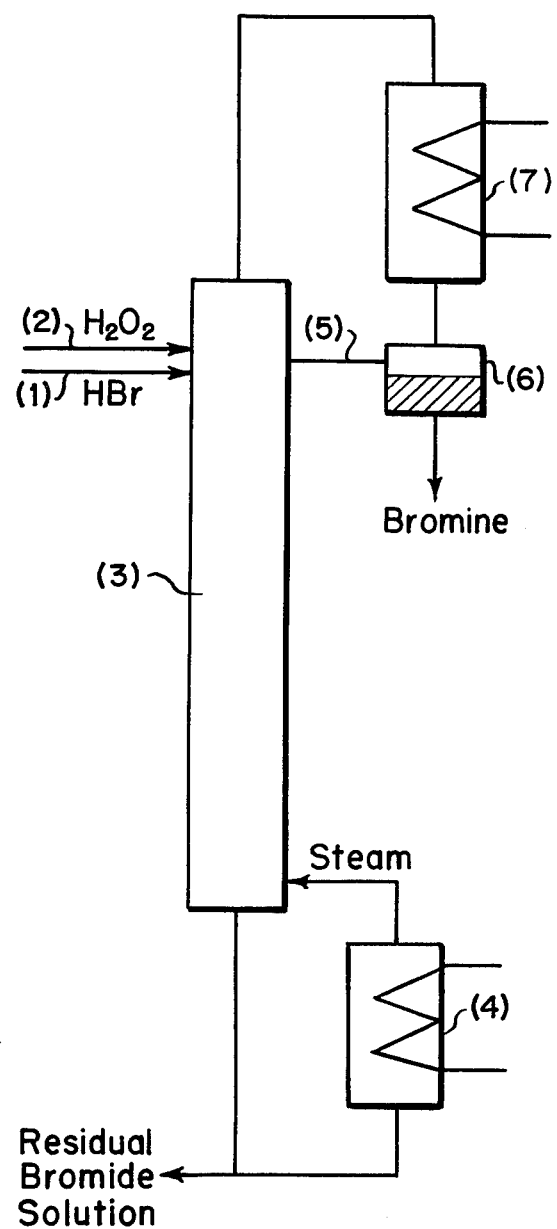

PREPARATION OF BROMINE

The present invention relates to a procedure for producing bromine from aqueous solutions containing bromide ions such as solutions of hydrobromic acid or its soluble salts.

BACKGROUND OF THE INVENTION

It is known to extract bromine from seawater or aqueous solutions containing bromide ions, by oxidizing the bromide ions. The preferred oxidizing agent is generally chlorine. Thus British Pat. No. 523,607 describes a procedure having the following steps:

a. Oxidation by chlorine of sodium bromide from seawater previously brought to a pH equal to 3.5.

b. Degassing of bromine from this solution by air.

c. Fixation of the bromine vapors by sulfur dioxide to form a so-called "bromosulfuric" solution containing 120–150 grams/liter of hydrobromic acid.

d. Extraction of bromine from this solution by the action of a new quantity of chlorine and sweeping out the vapor.

The use of chlorine, particularly for the last of these steps, presents several disadvantages including the production of hydrochloric acid and the presence of a considerable concentration of chlorine in the bromine obtained.

Other oxidants have been proposed. French Pat. No. 1,359,668 uses nitric acid as oxidant but this has disadvantages equal or greater than those of chlorine, involving destruction and regeneration of nitric oxides. The direct employ of oxygen itself is theoretically possible but temperatures as high as 800°–1000° C are required for complete reaction, as indicated in Brit. Pat. No. 585,728.

When present first considered using hydrogen peroxide to liberate bromine from bromides, they were discouraged by the statements of Pascal ("Nouveau traite de chimie minerale" Vol. XVI page 399 (Masson 1960).) indicating that the overall effect of contacting hydrobromic acid with hydrogen peroxide is the decomposition of the latter. Thus it is there stated "hydrogen peroxide undergoes on contact with hydrobromic acid solutions or acid solutions of bromides, a decomposition which causes the liberation of bromine. The phenomenon is due to a superimposition of two reactions:

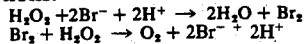

At a given moment the two phenomena compensate each other: the hydrobromic acid oxidized at each instant is regenerated, the concentration of H⁻ ions remains constant and the total effect is that hydrogen peroxide undergoes decomposition."

SUMMARY OF THE INVENTION

In constrast to this statement of Pascal, present applicants have found that it is nevertheless possible to prepare bromine with excellent yields by action of hydrogen peroxide on a hydrobromic acid solution. Such result is accomplished by using equipment arranged to effect the separation of the bromine substantially as rapidly as it is formed and in effect preventing the bromine from coming into contact with more hydrogen peroxide.

Briefly stated, the instant invention provides a method of preparing elemental bromine which comprises contacting hydrogen peroxide with an aqueous solution containing bromide ion and rapidly removing the bromine formed from the vicinity of hydrogen peroxide.

This method is particularly suitable for obtaining bromine from seawater using the conventional intermediate, bromosulfuric solution, as the source of bromide ion.

DETAILED DESCRIPTION

The equipment used to carry out the operation characteristic of the method of this invention must take into account the rapidity both of the reaction between hydrogen peroxide and bromide and of the reaction between bromine and hydrogen peroxide. The apparatus must therefore be designed to accomplish a short time of sojourn of the formed bromine in the vicinity where fresh amounts of hydrogen peroxide are entering.

Any means of suitably attaining these objectives can be employed. Thus in one embodiment of this method, the aqueous solution containing bromide is heated at reflux while hydrogen peroxide solution is gradually dropped into it. The bromine is evaporated as it is formed and passes off through the reflux condenser and is then condensed and collected.

A particularly satisfactory modification of the method of this invention is provided by using a separation column, preferably vertical, into which the reactant solutions are supplied, exemplarily at the top. The column is preferably packed with glass beads or other suitable inert packing material to provide a large surface area for mutual contacting of the reactants. The inflow of the reactant solutions is continuous or in small increments at relative overall rates such that about 0.1 to 1 mol of hydrogen peroxide, preferably about 0.6 to 0.8 mol, is fed for every mol of bromine ion. Simultaneously, the bromine formed is rapidly sparged and removed from the scene by an upward stream of inert gas or stream and collected in any conventional condensing system. In a particularly convenient arrangement, the separation column is connected at the bottom with a steam-distillation boiler or still. By careful adjustment, in a manner that will be readily understood by those trained in the art, the relative rates of reactant-feeds and distilling steam can be controlled to attain a maximum yield. The spent solutions leaving the bottom of the column can be collected for further processing.

The hydrogen peroxide used in carrying out this invention can be in any convenient form or concentration.

The method can be adapted to the concentration of any of the commercially available grades of aqueous solutions. Thus for example, aqueous solutions containing between about 30% and 60% by weight hydrogen peroxide can be conveniently used. The hydrogen peroxide is used in amount corresponding to 0.1 to 1 mols per mol of bromide treated, preferably between about 0.6 and 0.8 mols per mol. The bromide solutions treated can be of various origin, as for example residual acids from bromination reactions, effluents from the destruction of brominated products and the like. The procedure of this invention is particularly suitable for treating the bromosulfuric solution supplied in step (c) of the above described conventional process for recovery of bromine from sea-water. In this step sulfur dioxide reacts with bromine according to the equation $$Br_2 + SO_2 + 2H_2O \rightarrow 2HBr + H_2SO_4$$

The resulting bromosulfuric solution typically contains between about 0.12 and 0.15 kilograms/liter of hydrobromic acid, about 0.09 to 1.11 kilograms/liter of sulfuric acid and about 0.005 to 0.01 kilograms/liter of hydrochloric acid.

In the following examples, as also elsewhere herein proportions are expressed by weight unless specifically otherwise stated.

EXAMPLE 1

This example is not an illustration of the method of this invention, but shows how hydrogen peroxide decomposes rapidly in the presence of bromine if the conditions of this invention are not maintained.

To a liter of bromine water containing 0.15 mol of bromine, there is added, at 19° C, 27.5 mol of a 110-volume aqueous hydrogen peroxide solution (containing 0.27 mol $H_2O_2$) and the volume of the gas released is measured. It is observed that the gas formed corresponds to the decomposition of 10% of the $H_2O_2$ after 1 minute and 25% after 15 minutes.

At 49° C the decomposition is still more rapid. Starting with 0.04 mol $Br_2$ and 0.13 mol of $H_2O_2$, 35% of the $H_2O_2$ is decomposed after 1 minute, 44% at the end of 15 minutes.

EXAMPLE 2

Into a reactor surmounted by a packed reflux condenser column, and a dropping funnel, there is introduced 400 ml. (0.73 mols HBr) of an industrial bromosulfuric solution containing 147 grams/liter HBr and 98 grams/liter $H_2SO_4$.

The solution is heated to reflux. Then there is gradually added 37 ml. of a 110-volume aqueous hydrogen peroxide solution (0.36 mols $H_2O_2$).

In proportion to this addition, bromine is formed and trapped by distillation at the head of the column. In this manner 45 grams (0.28 mol) of bromine are collected. After the end of the reaction, the acid solution remaining in the reactor still contains 0.09 mols of HBr. The fraction of the hydrobromic acid converted is 76.7%; the yield based on hydrogen peroxide is 77.8%.

EXAMPLE 3

Referring to the accompanying drawing, FIG. 1, there were simultaneously and continuously added with the help of proportioning pumps 415 ml/hr of the bromosulfuric acid 1 used in Example 2 and 29.5 ml/hr of the same hydrogen peroxide solution 2 as used in Example 2 to the top part of a distillation column 3, packed with glass beads, surmounting a steam-distilling boiler or still 4 and equipped with an overflow tube 5 at constant level. The bromine formed was continuously steam-distilled off and collected in receiver 6 surmounted by cooler or condenser 7. The degree of heating the boiler or steam-distiller is regulated in such a manner that the concentration of bromine in the selection being evacuated by steam distillation is small. The bromine thus recovered at 6 is delivered at 37 grams/hour corresponding to a 61.35% conversion of HBr and a 79.65% yield based on hydrogen peroxide used.

EXAMPLE 4

Following the same procedure as in the previous example, bromosulfuric solution was introduced at a rate of 450 ml/hr and hydrogen peroxide solution at 20 ml/hr. Bromine recovered at the rate of 27.5 grams/hr. The conversion of hydrobromic acid was thus 21.05% and thus the yield based on hydrogen peroxide consumed was 87.75%.

It will be understood that it is intended to cover all changes and modifications of the examples of the invention herein chosen for the purpose of illustration which do not constitute departures from the spirit and scope of the invention.

We claim:

1. A method of preparing bromine in an aqueous medium which comprises
   a. contacting an aqueous solution of hydrogen peroxide with an aqueous solution containing bromide ions in an amount of about 0.1 to 1.0 mols of hydrogen peroxide per mol of bromide ion, to produce bromine;
   b. vaporizing and removing the bromine produced from the aqueous medium substantially as rapidly as it is produced by an upward stream of inert gas or steam to substantially prevent the bromine from reacting with the hydrogen peroxide; and
   c. condensing and collecting the bromine.

2. The method of claim 1 wherein continuous and simultaneous streams of an aqueous solution containing bromide ions and an aqueous hydrogen peroxide solution are fed to the top of a separation column and wherein the bromine is removed as rapidly as it is produced from the column by means of a stream of gas fed to the bottom of the column.

3. The method of claim 2 wherein the bromine is removed by steam distillation and the bromine is condensed and collected.

4. The method of claim 1 wherein the hydrogen peroxide is employed in an amount corresponding to about 0.6 to 0.8 mols of hydrogen peroxide per mol of bromide ion contacted.

5. The method of claim 1 wherein the aqueous solution containing bromide ions is comprised of an aqueous solution of hydrobromic acid or a soluble salt thereof.

6. The method of claim 5 wherein the aqueous solution containing bromide ions is a bromosulfuric solution containing about 120–150 gms/liter of hydrobromic acid.

7. A method of preparing bromine in a separation column which comprises continuously and simultaneously adding
   a. at the top of the column, an aqueous solution containing bromide ions;
   b. at the top of the column, an aqueous solution of hydrogen peroxide to produce bromine, the solution being added so that about 0.6 to 0.8 mols of hydrogen peroxide are added for each mol of bromide ion; and
   c. at the bottom of the column, steam, the steam being supplied in a quantity sufficient to vaporize and remove the bromine from the column substantially as rapidly as it is formed to substantially prevent the bromine from reacting with the hydrogen peroxide; and condensing and collecting the steam-distilled bromine.

8. A method of preparing bromine in a separation column which comprises continuously and simultaneously adding a. at the top of the column, a bromosulfuric solution containing about 120–150 gms/liter of hydrobromic acid;
b. at the top of the column, an aqueous solution of hydrogen peroxide to produce bromine, the solution being added so that about 0.6 to 0.8 mols of hydrogen peroxide are added for each mol of bromide ion; and
c. at the bottom of the column, steam, the steam being supplied in a quantity sufficient to vaporize and remove the bromine from the column substantially as rapidly as it is formed to substantially prevent the bromine from reacting with the hydrogen peroxide, and condensing and collecting the steam-distilled bromine.

* * * * *

UNITED STATES PATENT AND TRADEMARK OFFICE
CERTIFICATE OF CORRECTION

PATENT NO. : 4,029,732
DATED : June 14, 1977
INVENTOR(S) : Georges Calloue and Arséne Isard It is certified that error appears in the above-identified patent and that said Letters Patent are hereby corrected as shown below:

Column 1, line 37, "present first" should read --present applicants first--

Column 1, line 53, "$H^-$ions" should read --$H^+$ions--

Column 2, line 39, "stream", second occurrence, should read --steam--

Column 3, lines 59 and 60, "selection" should read --section--

Column 2, line 65,
Column 3, line 3,
Column 4, line 45,
and
Column 5, line 1, "bromosulfuric" should read --"bromosulfuric"--

Signed and Sealed this

Twenty-seventh Day of September 1977

[SEAL]

Attest:

RUTH C. MASON
Attesting Officer

LUTRELLE F. PARKER
Acting Commissioner of Patents and Trademarks